US011854582B2

(12) United States Patent
Nishida et al.

(10) Patent No.: US 11,854,582 B2
(45) Date of Patent: Dec. 26, 2023

(54) DISK DRIVE SUSPENSION (71) Applicant: NHK SPRING CO., LTD., Yokohama (JP)

(72) Inventors: Tatsuhiko Nishida, Yokohama (JP); Akira Nojima, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/082,875

(22) Filed: Dec. 16, 2022

(65) Prior Publication Data
US 2023/0197109 A1 Jun. 22, 2023

(30) Foreign Application Priority Data

Dec. 21, 2021 (JP) .................. 2021-207150

(51) Int. Cl.
*G11B 5/48* (2006.01)

(52) U.S. Cl.
CPC .......... *G11B 5/4826* (2013.01); *G11B 5/4833* (2013.01)

(58) Field of Classification Search
CPC .................... G11B 5/4826; G11B 5/4833
See application file for complete search history.

(56) References Cited

U.S. PATENT DOCUMENTS

| 5,333,085 | A | * | 7/1994 | Prentice | ............... | G11B 5/4826 |
| 5,530,606 | A | * | 6/1996 | Baasch | ................ | G11B 5/4826 |
| 5,680,275 | A | * | 10/1997 | Frater | .................. | G11B 5/4826 |
| | | | | | | 360/234.5 |
| 5,771,136 | A | * | 6/1998 | Girard | ..................... | G11B 21/21 |
| 5,892,637 | A | * | 4/1999 | Brooks, Jr. | .......... | G11B 5/4853 |
| | | | | | | 360/234.5 |
| 6,163,438 | A | * | 12/2000 | Kajitani | ............... | G11B 5/6005 |
| 6,172,853 | B1 | * | 1/2001 | Davis | ..................... | G11B 5/488 |
| 6,191,915 | B1 | * | 2/2001 | Takagi | ................. | G11B 5/4833 |
| 6,201,664 | B1 | * | 3/2001 | Le | ........................... | G11B 5/486 |
| | | | | | | 360/245.9 |
| 6,233,121 | B1 | * | 5/2001 | Pan | ..................... | G11B 5/4826 |
| 6,243,235 | B1 | * | 6/2001 | Fu | .......................... | G11B 5/488 |
| | | | | | | 360/234.5 |
| 6,320,729 | B1 | * | 11/2001 | Coon | ................... | G11B 5/4826 |
| 6,424,498 | B1 | * | 7/2002 | Patterson | ............. | G11B 5/4826 |
| 6,483,670 | B1 | * | 11/2002 | Watanabe | ............ | G11B 5/4833 |
| 6,538,850 | B1 | * | 3/2003 | Hadian | ................ | G11B 5/4853 |
| | | | | | | 360/255 |
| 6,611,402 | B1 | * | 8/2003 | Mangold | ............. | G11B 5/4826 |
| | | | | | | 360/255 |

(Continued)

FOREIGN PATENT DOCUMENTS

| JP | 2013149341 A | 8/2013 |
| JP | 2015041394 A | 3/2015 |

*Primary Examiner* — Brian E Miller
(74) *Attorney, Agent, or Firm* — Holtz, Holtz & Volek PC (57) ABSTRACT A suspension includes a load beam, a flexure and a dimple portion. The flexure includes a tongue. The dimple portion swingably supports the tongue at least over a first position and a second position. In the tongue, first pillow portions supporting a slider and an adhesive portion fixing the slider are provided. In the load beam, a second pillow portion protruding towards the slider is provided. The second pillow portion is in contact with the slider when the tongue is located at the first position, and separates from the slider when the tongue has moved to the second position.

8 Claims, 10 Drawing Sheets

(56) References Cited

U.S. PATENT DOCUMENTS

| | | | |
|---|---|---|---|
| 6,747,849 B1* | 6/2004 | Le | G11B 5/484 |
| 6,757,137 B1* | 6/2004 | Mei | G11B 5/486 |
| | | | 360/245.9 |
| 6,801,400 B2* | 10/2004 | Fu | G11B 5/4826 |
| 6,885,523 B1* | 4/2005 | Summers | G11B 5/486 |
| 6,967,821 B2* | 11/2005 | Himes | G11B 5/4826 |
| 6,995,953 B2* | 2/2006 | Mahoney | G11B 5/4826 |
| 7,006,333 B1* | 2/2006 | Summers | G11B 5/4826 |
| 7,010,847 B1* | 3/2006 | Hadian | G11B 5/4853 |
| | | | 29/603.03 |
| 7,085,104 B1* | 8/2006 | Hadian | G11B 5/54 |
| 7,307,817 B1* | 12/2007 | Mei | G11B 5/4826 |
| | | | 360/245.9 |
| 7,551,401 B1* | 6/2009 | Ciurea | G11B 5/4826 |
| | | | 360/245.7 |
| 7,688,552 B2* | 3/2010 | Yao | G11B 5/4853 |
| | | | 29/603.03 |
| 7,719,797 B1* | 5/2010 | Mei | G11B 19/042 |
| | | | 360/245.7 |
| 7,751,149 B1* | 7/2010 | Mei | G11B 5/6005 |
| | | | 360/245.7 |
| 7,852,604 B2* | 12/2010 | Sassine | G11B 5/4853 |
| | | | 360/245.9 |
| 8,107,198 B1* | 1/2012 | Ee | G11B 21/16 |
| | | | 360/245.3 |
| 8,446,695 B1* | 5/2013 | Ee | G11B 5/4826 |
| | | | 360/245.9 |
| 9,025,282 B1* | 5/2015 | Miller | H05K 3/0061 |
| | | | 360/245.3 |
| 9,117,466 B2 | 8/2015 | Takikawa et al. | |
| 9,214,176 B1* | 12/2015 | Sharma | G11B 5/483 |
| 11,308,982 B1* | 4/2022 | Pallay | G11B 5/4833 |
| 2001/0012181 A1* | 8/2001 | Inoue | G11B 5/4833 |
| | | | 360/245.3 |
| 2001/0012182 A1* | 8/2001 | Boutaghou | G11B 5/4853 |
| 2003/0137774 A1* | 7/2003 | Fu | G11B 5/4826 |
| 2003/0202284 A1* | 10/2003 | Arya | G11B 5/484 |
| 2004/0070883 A1* | 4/2004 | Mahoney | G11B 5/4833 |
| 2005/0047021 A1* | 3/2005 | Kim | G11B 5/4833 |
| | | | 360/245.7 |
| 2005/0180052 A1* | 8/2005 | Suzuki | G11B 5/4826 |
| 2006/0034017 A1* | 2/2006 | Agari | G11B 5/4853 |
| 2006/0092571 A1* | 5/2006 | Kang | G11B 5/4833 |
| 2006/0209466 A1* | 9/2006 | Ono | G11B 5/4833 |
| | | | 360/245 |
| 2006/0227464 A1* | 10/2006 | Huang | G11B 5/48 |
| 2006/0274452 A1* | 12/2006 | Arya | G11B 5/4806 |
| | | | 360/245.3 |
| 2006/0274453 A1* | 12/2006 | Arya | G11B 5/4806 |
| | | | 360/245.3 |
| 2007/0263323 A1* | 11/2007 | Uematsu | G11B 5/4826 |
| | | | 360/234.6 |
| 2009/0244786 A1* | 10/2009 | Hatch | G11B 5/483 |
| | | | 360/294.4 |
| 2010/0315744 A1* | 12/2010 | Virmani | G11B 5/4826 |
| | | | 360/245.3 |
| 2014/0362476 A1* | 12/2014 | Miller | G11B 5/4833 |
| | | | 360/245.7 |
| 2021/0151073 A1* | 5/2021 | Yamada | G11B 5/4833 |
| 2021/0280209 A1* | 9/2021 | Suzuki | G11B 5/4846 |
| 2021/0390979 A1* | 12/2021 | Ee | G11B 5/59694 |
| 2023/0197109 A1* | 6/2023 | Nishida | G11B 5/4826 |
| | | | 360/245.3 |

* cited by examiner

PRIOR ART

DISK DRIVE SUSPENSION

CROSS-REFERENCE TO RELATED APPLICATIONS

This application is based upon and claims the benefit of priority from prior Japanese Patent Application No. 2021-207150, filed Dec. 21, 2021, the entire contents of which are incorporated herein by reference.

BACKGROUND OF THE INVENTION

1. Field of the Invention

The present invention relates to a disk drive suspension comprising a tongue on which a slider is mounted, especially, a disk drive suspension comprising an actuator which moves a slider.

2. Description of the Related Art

For information processing devices such as personal computers, hard disk drives (HDD) are used. A hard disk drive includes a magnetic disk which rotates around a spindle, a carriage which rotates about a pivot, etc. The carriage comprises an arm portion. The carriage rotates about the pivot by a positioning motor such as a voice coil motor.

To the arm portion of the carriage, a disk drive suspension (hereinafter, referred to as a suspension) is attached. The suspension includes a load beam, a flexure, etc. The flexure is provided along the load beam. A slider is mounted on a tongue formed near the distal end of the flexure. In the slider, an element (transducer) is provided. The element performs access such as data reading or writing. The load beam, the flexure, the slider and the like constitute a gimbal assembly.

JP 2013-149341 A (Patent Literature 1) describes an example of suspensions. In this suspension, a slider is fixed to a tongue in the manufacturing process of a gimbal assembly. To fix the slider to the tongue, usually, an adhesive is used. When the slider is fixed to the tongue by the adhesive, the postures of the tongue and the slider should be stabilized. To stabilize them, a protrusion portion called a pillow portion is formed in the tongue. By the pillow portion, the slider is supported at a predetermined position on the tongue. In this state, the adhesive is cured.

To correspond to the increase in recording density of disks, a co-located actuator (CLA) type of suspension is known. An example of CLA types of suspensions is described in JP 2015-41394 A (Patent Literature 2). In this suspension, an actuator is provided in the gimbal portion of a flexure. For example, the actuator consists of a piezoelectric body such as lead zirconate titanate (PZT). By the actuator, the movable side portion of a tongue can be slightly moved in a sway direction. In this specification, the sway direction is the width direction of the distal end portion of the suspension.

In the CLA type of suspension, a slider mounted on the tongue moves in a sway direction by the actuator. For this reason, the tongue is divided into a first tongue portion and a second tongue portion. The first tongue portion and the second tongue portion are connected to each other by a hinge portion. For example, the trailing side portion of the slider is fixed to the second tongue portion by an adhesive. The leading side portion of the slider can move with respect to the first tongue portion. In this specification, the leading side is the inflow side of the air which flows between the slider and a disk when the disk rotates. The trailing side is the outflow side of air.

In the suspension of Patent Literature 2, an adhesive is supplied to the second tongue portion in the manufacturing process of a gimbal assembly. The trailing side portion of the slider is fixed to the second tongue portion by the adhesive. To stabilize the posture of the slider at the time of this attachment by the adhesive, a plurality of pillow portions are provided in the tongue. The slider is supported at a predetermined position of the tongue by these pillow portions. In a state where a certain load is applied to the slider, the adhesive is cured. The suspension manufactured in this way is incorporated into a disk drive and used.

When the manufactured disk drive is used, in a state where the disk rotates, data access with respect to the recording surface of the disk is performed by the element of the slider. In the co-located actuator (CLA) type of suspension, the slider is slightly moved in a sway direction by the operation of the actuator. The actuator is provided in the gimbal portion. As the slider slightly moves in a sway direction, the suspension can correspond to the recording surface of a high-density disk.

In the CLA type of suspension, the inventors of the present invention and colleagues earnestly examined the behavior of the tongue. As a result, the following findings were obtained. The inventors fully examined the move stroke of the second tongue portion with respect to a rotating disk in a sway direction. As a result, they found that the stroke largely changed on an irregular base depending on the suspension.

As a cause for the change, the slider unstably came in contact with the pillar portion when the slider moved in a sway direction. For example, behaviors in which the slider unstably came in contact with or separated from the pillar portion were confirmed. When the slider moved with an unstable stroke in a sway direction, the oscillation mode of the CLA type of suspension was affected, thereby disturbing the frequency characteristics.

An embodiment aims to provide a disk drive suspension which can stabilize the stroke of a tongue with a slider in a sway direction.

BRIEF SUMMARY OF THE INVENTION

According to an embodiment, a suspension comprises a load beam, a flexure provided along the load beam, and a dimple portion. The flexure comprises a tongue on which a slider is mounted. The dimple portion is provided between the load beam and the tongue. The dimple portion comprises a protrusion portion. The protrusion portion swingably supports the tongue in a thickness direction of the tongue at least over a first position and a second position.

The tongue comprises a first surface, a second surface, first pillow portions and an adhesive portion for fixing the slider. The first surface faces the load beam. The slider is mounted on the second surface. The first pillow portions support the slider. On the load beam, a second pillow portion is provided. The second pillow portion protrudes toward the slider. The second pillow portion is in contact with the slider when the tongue is located at the first position, and separates from the slider when the tongue has moved to the second position.

According to the suspension of the present embodiment, the behavior of the tongue on which the slider is mounted is stabilized. In particular, the stroke in a sway direction is stabilized, and a fluctuation in the frequency characteristics can be suppressed. In particular, in the co-located actuator (CLA) type of suspension of the present embodiment, the stroke in a sway direction can be stabilized.

An opening portion into which the second pillow portion is inserted may be formed in the tongue.

The tongue may comprise a first tongue portion, a second tongue portion and a hinge portion. In the first tongue portion, a leading side portion of the slider is movably placed. To the second tongue portion, a trailing side portion of the slider is fixed by the adhesive portion. The hinge portion connects the first tongue portion and the second tongue portion. On the both sides of the tongue, actuator elements which drive the second tongue portion in a sway direction may be provided.

The load beam may comprise a height controlling protrusion portion. The height controlling protrusion portion controls a distance from the second surface to a distal end of the second pillow portion. The height controlling protrusion portion may be provided on the tongue. For example, the height controlling protrusion portion consists of a bent part formed by bending part of the tongue toward the load beam. The first pillow portions may include a trailing side pillow provided on the second tongue portion, and a dimple side pillow provided at a position corresponding to the dimple portion.

According to another embodiment, a suspension comprises a second pillow portion provided on a slider. The second pillow portion of this embodiment protrudes from an opening portion formed in a tongue towards a load beam. The second pillow portion is in contact with the load beam when the tongue is located at a first position, and separates from the load beam when the tongue has moved to a second position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

This specification hereinafter explains a disk drive suspension according to the first embodiment of the present invention with reference to FIG. 1 to FIG. 10.

Figure 1:
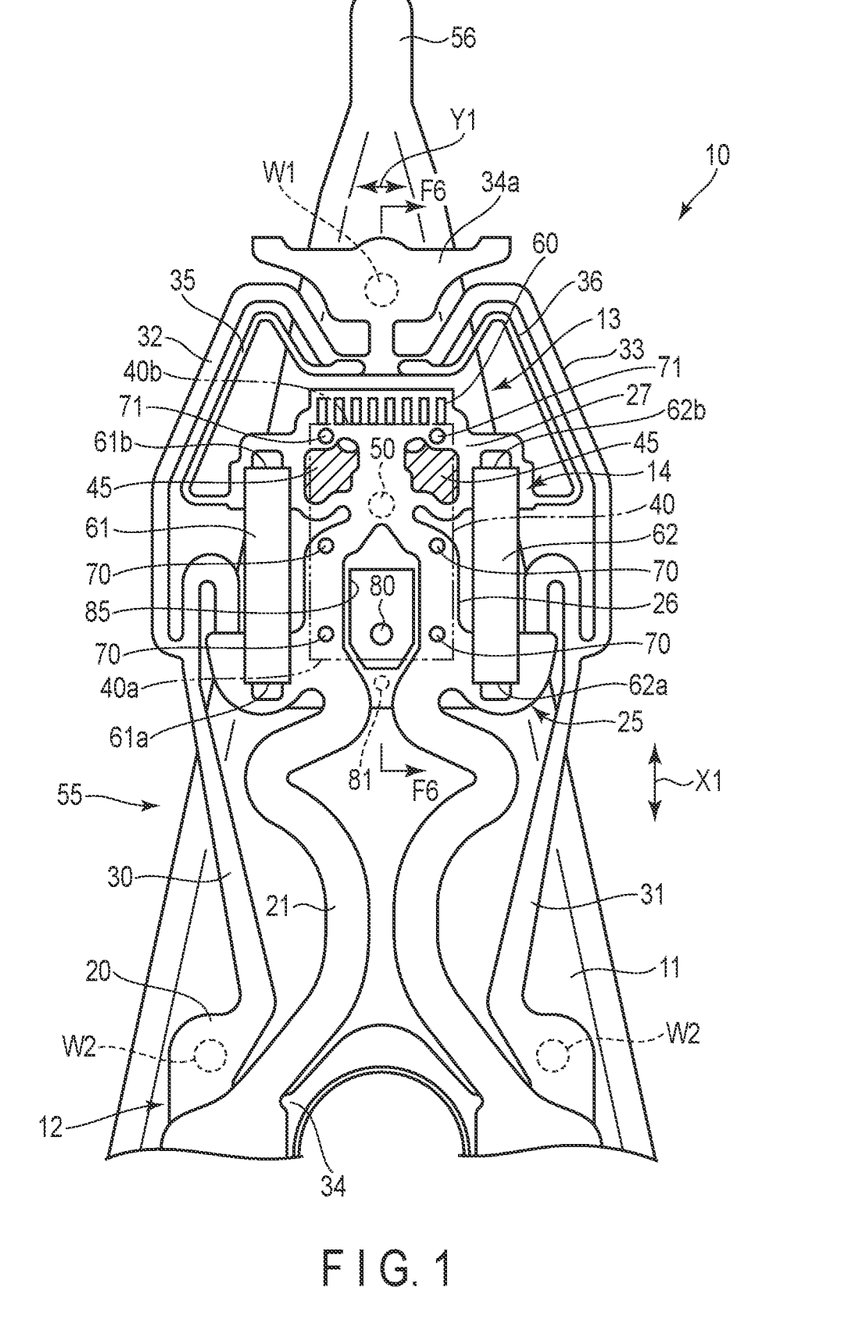
FIG. 1 is a plan view of part of a suspension according to a first embodiment.
Figure 2:
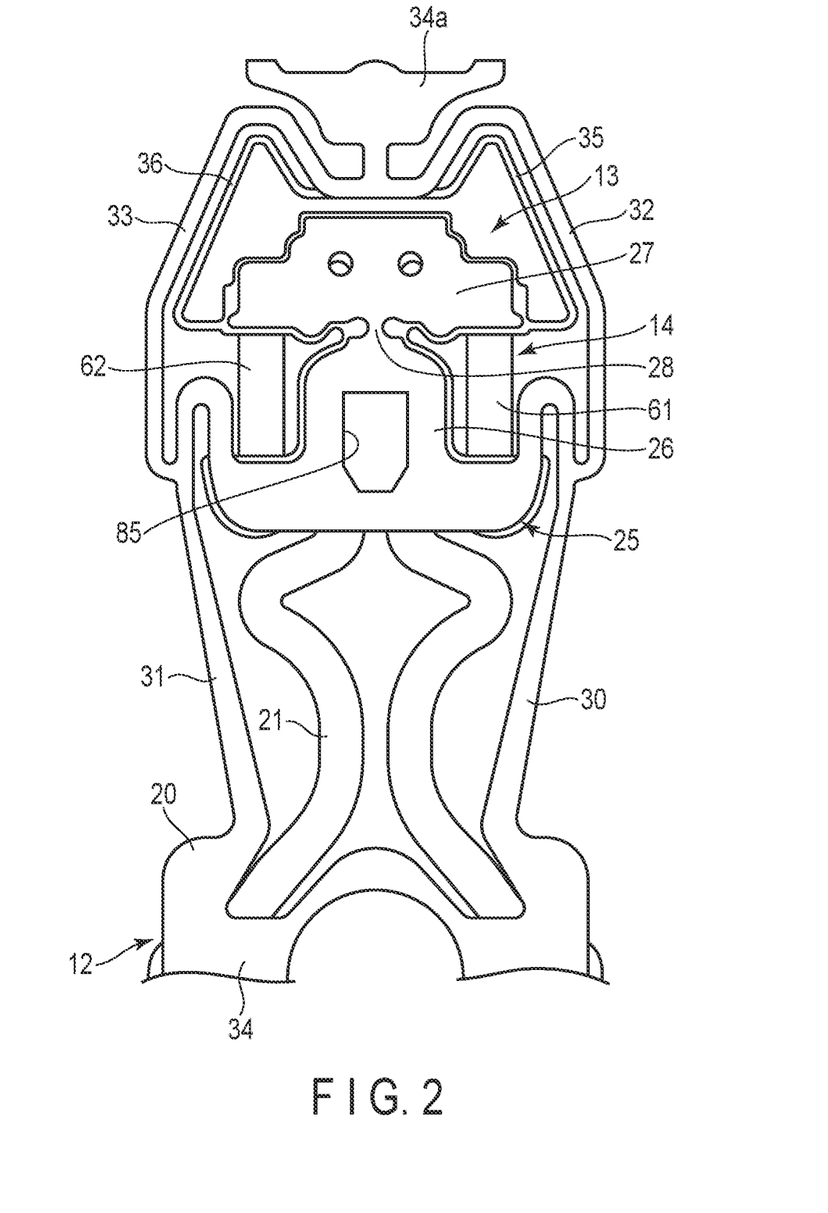
FIG. 2 is a plan view in which the flexure of the suspension shown in FIG. 1 is viewed on the opposite side of FIG. 1.
Figure 3:
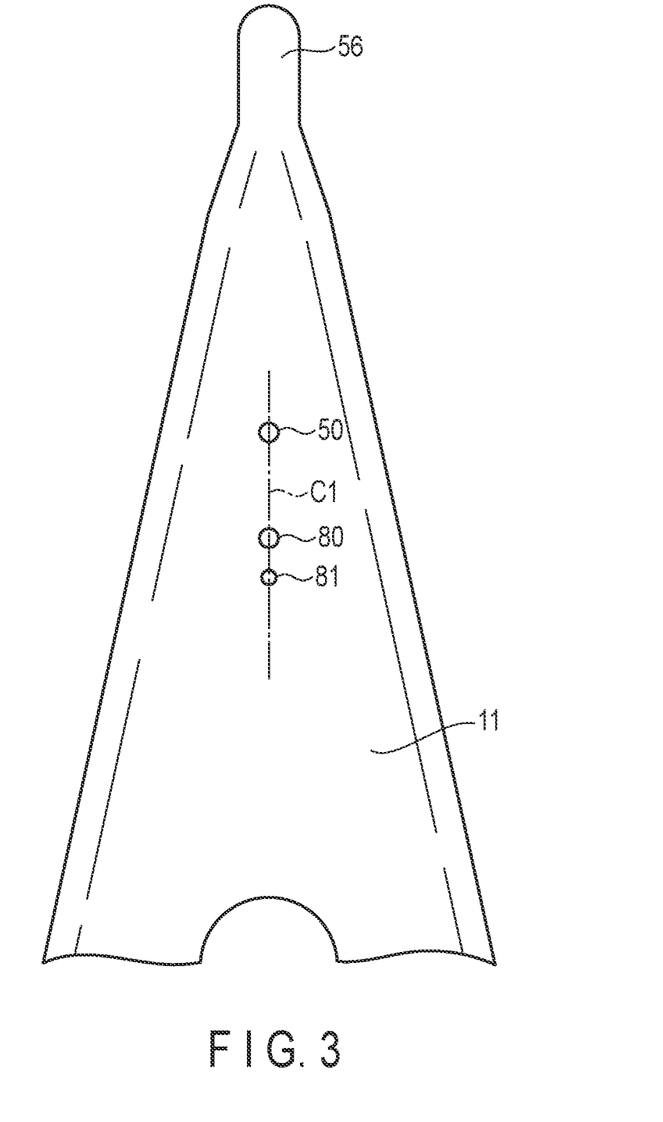
FIG. 3 is a plan view of part of the load beam of the suspension shown in FIG. 1.

FIG. 1 is a plan view showing part of a co-located actuator (CLA) type of suspension 10. The suspension 10 includes a load beam 11, a flexure 12, an actuator mounting portion 14, etc. The flexure 12 is provided along the load beam 11. The actuator mounting portion 14 is provided in the gimbal portion 13 of the flexure 12. FIG. 2 is a plan view in which the flexure 12 is viewed on the opposite side of FIG. 1. FIG. 3 is a plan view of part of the load beam 11.

The load beam 11 consists of a plate of stainless steel. The load beam 11 extends in the length direction of the suspension 10. The thickness of the load beam 11 is, for example, 20 to 40 μm. However, the thickness may be different from this example. The directions shown by two-headed arrow Xl in FIG. 1 are the longitudinal direction of the load beam 11, in other words, the longitudinal direction of the suspension 10. In FIG. 1, two-headed arrow Y1 indicates a sway direction, in other words, the width direction of the distal end portion of the flexure 12.

The flexure 12 includes a metal base 20 and a wiring portion 21. The metal base 20 consists of a thin plate of stainless steel. The wiring portion 21 is provided along the metal base 20. For example, the thickness of the metal base 20 is 20 μm (12 to 25 μm). The thickness of the metal base 20 is less than that of the load beam 11.

As shown in FIG. 1, the metal base 20 is fixed to the load beam 11 by a first weld portion W1 and a second weld portion W2. The wiring portion 21 includes a base insulating layer, a plurality of conductors and a cover layer covering the conductors. The base insulating layer is formed of electrically insulating resin such as polyimide. The conductors are formed on the base insulating layer.

Near the distal end of the flexure 12, a tongue 25 which is part of the gimbal portion 13 is formed. As shown in FIG. 2, the tongue 25 includes a first tongue portion 26, a second tongue portion 27 and a hinge portion 28. The hinge portion 28 is formed between the first tongue portion 26 and the second tongue portion 27. All of the first tongue portion 26, the second tongue portion 27 and the hinge portion 28 are part of the metal base 20. The outline of each of the first tongue portion 26, the second tongue portion 27 and the hinge portion 28 is formed by, for example, etching.

First arms 30 and 31 and second arms 32 and 33 are formed in part of the metal base 20. The first tongue portion 26 is elastically supported in a flexure body 34 and a flexure distal end portion 34a by the first arms 30 and 31 and the second arms 32 and 33. The second tongue portion 27 is connected to the first tongue portion 26 via the hinge portion 28. The width of the hinge portion 28 is sufficiently less than that of the first tongue portion 26 and the second tongue portion 27. The second tongue portion 27 can rotate with respect to the first tongue portion 26 in a sway direction (shown by two-headed arrow Y1 in FIG. 1).

The second tongue portion 27 and the flexure distal end portion 34a are connected to each other by limiter members 35 and 36. The limiter members 35 and 36 prevent the tongue 25 from excessively swinging and a dimple separation from forming when, for example, an impact is made on the suspension 10 from outside.

A slider 40 is mounted on the tongue 25. The leading side portion 40a of the slider 40 is movably provided in the first tongue portion 26 of the tongue 25. The leading side portion 40a can move in a direction parallel to the surface of the first tongue portion 26 with respect to the first tongue portion 26. The trailing side portion 40b of the slider 40 is fixed to the second tongue portion 27 by an adhesive.

In this specification, the leading side is the inflow side of the air which flows between the slider 40 and a disk when the disk rotates. The trailing side is the outflow side of air. The adhesive to fix the slider 40 is supplied to an adhesive portion 45 (shown by hatching in FIG. 1) set in the second tongue portion 27.

Figure 4:
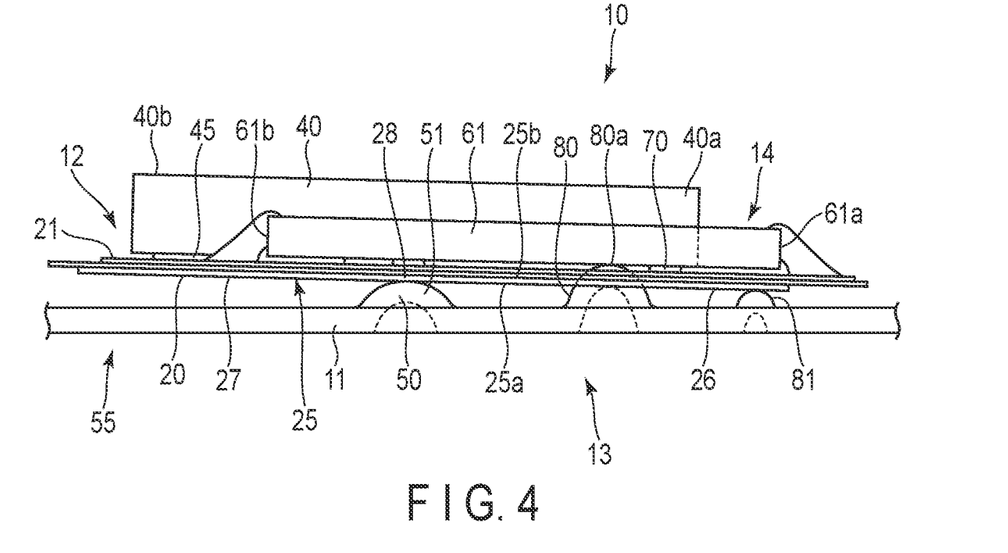
FIG. 4 is a side view of part of the suspension shown in FIG. 1 when a tongue is located at a first position.

A dimple portion 50 is formed between the load beam 11 and the tongue 25. For example, the dimple portion 50 is formed on the load beam 11. As shown in FIG. 4, the dimple portion 50 comprises a protrusion portion 51 which protrudes toward the tongue 25 in a dome shape. In another embodiment, the dimple portion 50 may be formed on the tongue 25. In that case, the protrusion portion 51 of the dimple portion 50 is in contact with the load beam 11.

As shown in FIG. 4, the distal end of the protrusion portion 51 of the dimple portion 50 is in contact with the tongue 25. In this state, the tongue 25 can swing based on the dimple portion 50 in the thickness direction of the tongue 25. In other words, the tongue 25 can swing with respect to the load beam 11 at least over a first position (shown in FIG. 4 and FIG. 6) and a second position (shown in FIG. 5 and FIG. 7). The load beam 11, the flexure 12, the slider 40 and the like constitute a gimbal assembly 55.

In this specification, the first position (FIG. 4 and FIG. 6) is the position of the tongue 25 when the slider 40 is fixed to the tongue 25 in the manufacturing process of the gimbal assembly 55. When the suspension 10 is incorporated into a disk drive, and the tab 56 (shown in FIG. 1 and FIG. 3) of the load beam 11 runs on a standby ramp (unload state), the tongue 25 is also at the first position.

The second position (FIG. 5 and FIG. 7) is the position of the tongue 25 in a state where the slider 40 has moved onto a disk 58 (load state) when the manufactured disk drive is used. In other words, in a load state in which the slider 40 has moved onto the disk 58, the tongue 25 is at the second position.

Figure 5:
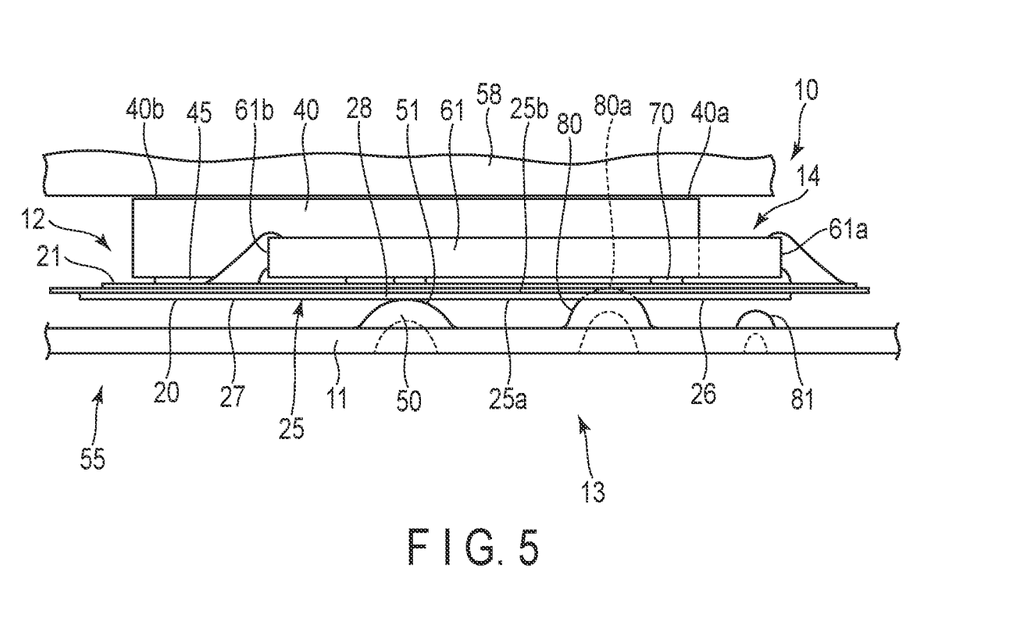
FIG. 5 is a side view of part of the suspension shown in FIG. 1 when the tongue is located at a second position (at the time of loading).
Figure 6:
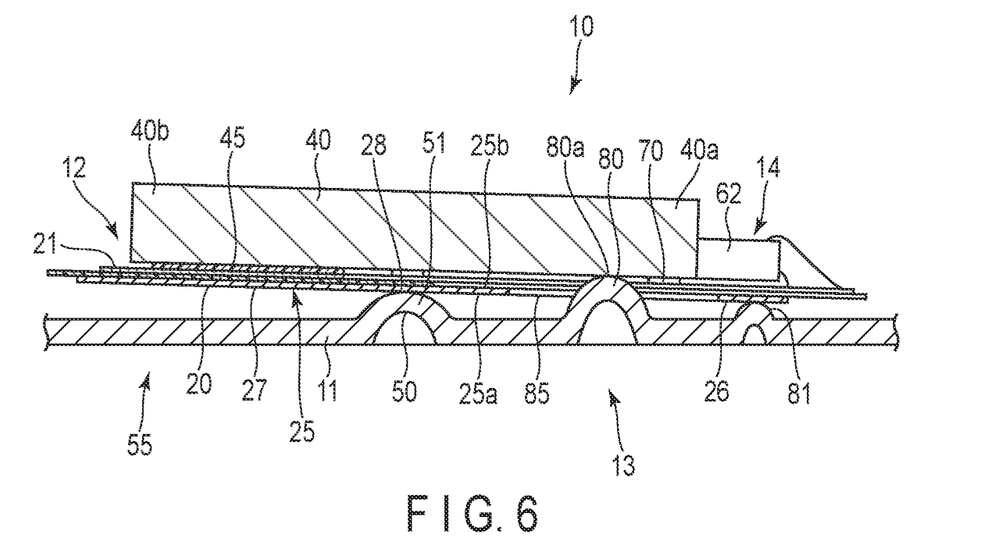
FIG. 6 is a cross-sectional view of part of the suspension shown in FIG. 1 when the tongue is at the first position along the F6-F6 line of FIG. 1.
Figure 7:
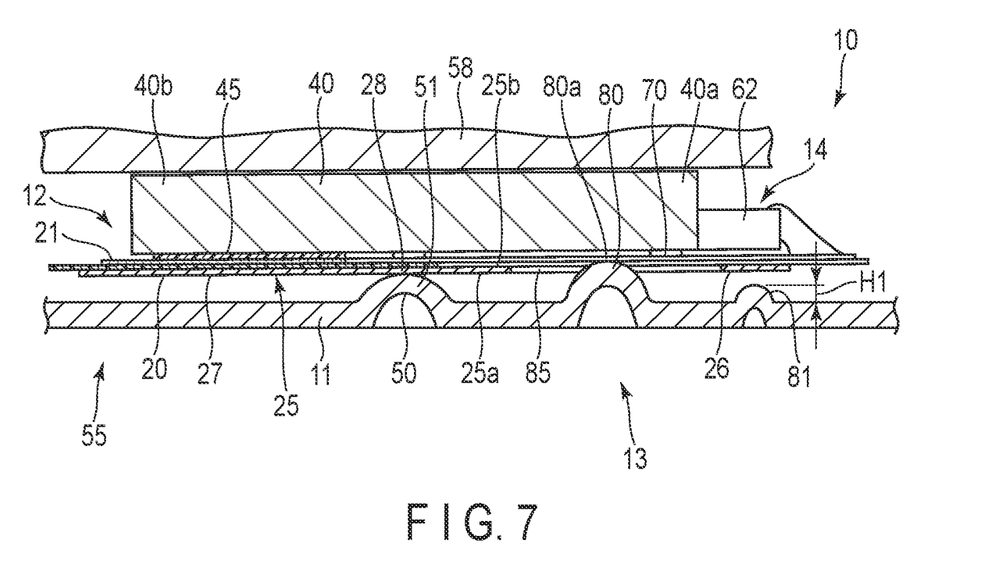
FIG. 7 is a cross-sectional view of part of the suspension shown in FIG. 1 when the tongue is at the second position along the F6-F6 line of FIG. 1.

FIG. 4 is a side view of part of the suspension 10 when the tongue 25 is located at the first position. FIG. 6 is a cross-sectional view of part of the suspension 10 when the tongue 25 is located at the first position. FIG. 5 is a side view of part of the suspension 10 when the tongue 25 has moved to the second position (load state). FIG. 7 is a cross-sectional view of part of the suspension 10 when the tongue 25 has moved to the second position. As shown in FIG. 4 to FIG. 7, the tongue 25 comprises a first surface 25a and a second surface 25b. The first surface 25a faces the load beam 11. The second surface 25b is the opposite surface of the first surface 25a. On the second surface 25b, the slider 40 constituting a magnetic head is mounted.

A plurality of elements are provided in an end portion of the trailing side portion 40b of the slider 40. For example, each element is a magnetoresistive element (MR element) which can convert a magnetic signal into an electric signal. These elements perform access such as data writing or reading with respect to the disk 58. A terminal portion 60 (shown in FIG. 1) is provided in the second tongue portion 27. The terminal portion 60 is electrically connected to the elements of the slider 40. The terminal portion 60 is connected to the conductors of the wiring portion 21.

The actuator mounting portion 14 includes a pair of actuator elements 61 and 62. The actuator elements 61 and 62 are provided on the both sides of the tongue 25. The actuator elements 61 and 62 consist of, for example, a piezoelectric body such as lead zirconate titanate (PZT). The actuator elements 61 and 62 have a function of slightly rotating the second tongue portion 27 in a sway direction.

As shown in FIG. 1, the first end portions 61a and 62a of the actuator elements 61 and 62 are fixed to the first tongue portion 26 by an adhesive, etc. The second end portions 61b and 62b of the actuator elements 61 and 62 are fixed to the second tongue portion 27 by an adhesive, etc.

As shown in FIG. 1, a plurality of first pillow portions 70 and 71 are formed on the second surface 25b of the tongue 25. Of the first pillow portions 70 and 71, the first pillow portions 70 located on the leading side are formed on the first tongue portion 26. Of the first pillow portions 70 and 71, the first pillow portions 71 located on the trailing side are formed on the second tongue portion 27.

The first pillow portions 70 located on the leading side support the leading side portion 40a of the slider 40. The first pillow portions 71 located on the trailing side support the trailing side portion 40b of the slider 40. The first pillow portions 70 and 71 are formed of, for example, resin such as polyimide, and form a convex shape from the second surface 25b of the tongue 25 toward the slider 40. The first pillow portions 70 and 71 support the slider 40 at predetermined positions of the tongue 25 with predetermined postures.

A second pillow portion 80 and a height controlling protrusion portion 81 are formed on the load beam 11. In FIG. 3, a virtual straight line extending in the length direction of the load beam 11 is shown by C1. The dimple portion 50, the second pillow portion 80 and the height controlling protrusion portion 81 are formed on the straight line C1 in the center of the width direction of the load beam 11. The height controlling protrusion portion 81 is explained in detail later.

As shown in FIG. 1, FIG. 6 and FIG. 7, an opening portion 85 is formed in the first tongue portion 26. The second pillow portion 80 is formed at a position facing the opening portion 85. The second pillow portion 80 protrudes from the opening portion 85 toward the slider 40. When the tongue 25 is located at the first position (FIG. 4 and FIG. 6), the distal end 80a of the second pillow portion 80 is in contact with the slider 40.

In the manufacturing process of the gimbal assembly 55, an adhesive is supplied to the adhesive portion 45 (shown in FIG. 1) of the tongue 25. Subsequently, the slider 40 is placed on the second surface 25b of the tongue 25. At this time, the tongue 25 is located at the first position (shown in FIG. 4 and FIG. 6). The slider 40 placed in the tongue 25 is supported at a predetermined position of the tongue 25 by the first pillow portions 70 and 71.

As shown in FIG. 4 and FIG. 6, when the tongue 25 is located at the first position, the distal end 80a of the second pillow portion 80 is in contact with the leading side portion 40a of the slider 40. By the second pillow portion 80, the leading side portion 40a of the slider 40 is supported on the load beam 11. The height controlling protrusion portion 81 is in contact with the first tongue portion 26. Thus, the first tongue portion 26 is supported by the load beam 11 via the height controlling protrusion portion 81. In a state where the tongue 25 is located at the first position and the second pillow portion 80 is in contact with the slider 40, height H1 (shown in FIG. 7) of the height controlling protrusion portion 81 is set such that the height controlling protrusion portion 81 is in contact with the first tongue portion 26.

When the tongue 25 is located at the first position as shown in FIG. 6, the distal end 80a of the second pillow portion 80 protrudes from the second surface 25b toward the slider 40. The protrusion height (the distance from the second surface 25b to the distal end 80d) is controlled by the height controlling protrusion portion 81. In other words, height H1 (shown in FIG. 7) of the height controlling protrusion portion 81 is set such that the position (height) of the distal end 80a of the second pillow portion 80 is equal to the height of the first pillow portions 70 and 71. Thus, the height of the distal end 80a of the second pillow portion 80 can be made equal to that of the first pillow portions 70 and 71.

In this way, when the slider 40 is attached to the tongue 25 by the adhesive, the slider 40 is supported on the tongue 25 by the first pillow portions 70 and 71 and the second pillow portion 80. At the same time, the slider 40 is supported on the load beam 11 via the second pillow portion 80. Further, the first tongue portion 26 is supported on the load beam 11 via the height controlling protrusion portion 81.

In a structure in which the second pillow portion 80 is not provided, when the slider 40 is attached to the tongue 25 by the adhesive, the slider 40 is supported on the tongue 25 by only the first pillow portions 70 and 71. In this case, the load applied from the upper side of the slider 40 is partially input in a direction which deforms the first tongue portion 26 via the first pillow portions 70. This input causes the destabilization of the contact state between the first pillow portions 70 and the slider 40.

In the present embodiment, when the slider 40 is attached to the tongue 25 by the adhesive, the slider 40 is supported on the tongue 25 by the first pillow portions 70 and 71, and at the same time, the leading side portion 40a of the slider 40 is supported on the load beam 11 by the second pillow portion 80. In addition, the first tongue portion 26 is supported on the load beam 11 by the height controlling protrusion portion 81. This structure prevents the application of the load input from the upper side of the slider 40 in a direction which deforms the first tongue portion 26. Thus, the contact state between the first pillow portions 70 and the slider 40 is stabilized.

As shown in FIG. 5 and FIG. 7, when the slider 40 moves to a position parallel to the surface of the disk 58, and thus transitions to a load state, the tongue 25 is located at the second position. When the tongue 25 is located at the second position, the distal end 80a of the second pillow portion 80 separates from the slider 40. Further, the height controlling protrusion portion 81 separates from the first tongue portion 26. In this state, the tongue 25 is swingably supported by the dimple portion 50 and exerts a gimbal function.

Figure 8:
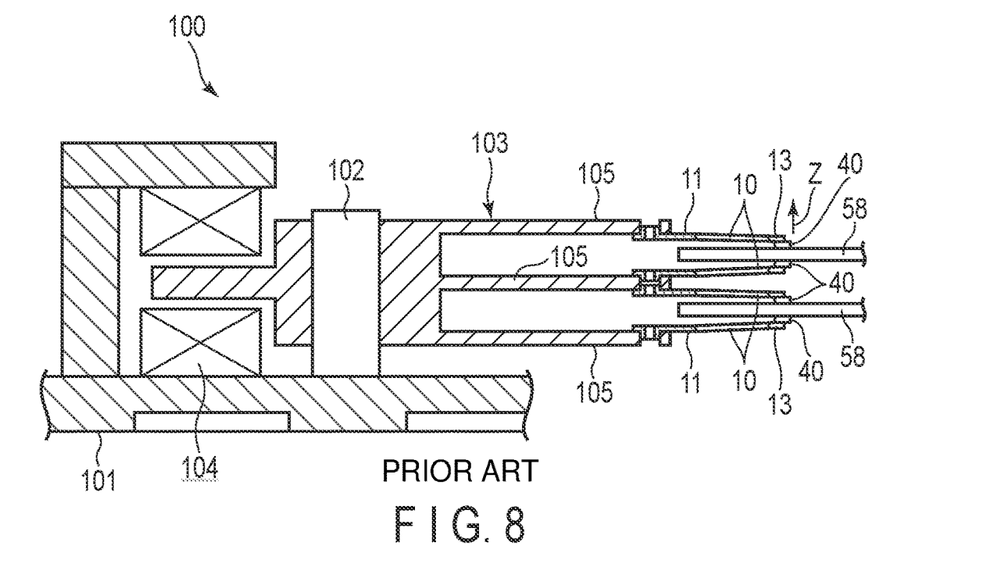
FIG. 8 is a cross-sectional view schematically showing an example of a disk drive.

FIG. 8 is a cross-sectional view schematically showing an example of a hard disk drive (HDD) 100. The disk drive 100 comprises a case 101 (partly shown), the disk 58, a carriage 103, a positioning motor 104, etc. The case 101 is sealed by a cover. The disk 58 rotates around a spindle. The carriage 103 rotates about a pivot 102 by the positioning motor 104. The carriage 103 comprises an arm portion 105. To the distal end of the arm portion 105, the suspension 10 is attached.

When the carriage 103 is caused to rotate by the positioning motor 104, the suspension 10 moves in the radial direction of the disk 58. In this way, the slider 40 moves to a desired position of the disk 58. When the disk 58 rotates, an air bearing is formed between the slider 40 and the disk 58.

When voltage is applied to the actuator elements 61 and 62 shown in FIG. 1, etc., the actuator elements 61 and 62 twist in the opposite directions of each other based on the voltage. In this way, the second tongue portion 27 rotates based on the hinge portion 28 with respect to the first tongue portion 26. Thus, the trailing side portion 40b of the slider 40 can be positioned in a sway direction (shown by two-headed arrow Y1 in FIG. 1) at high speeds with high accuracy.

Figure 9:
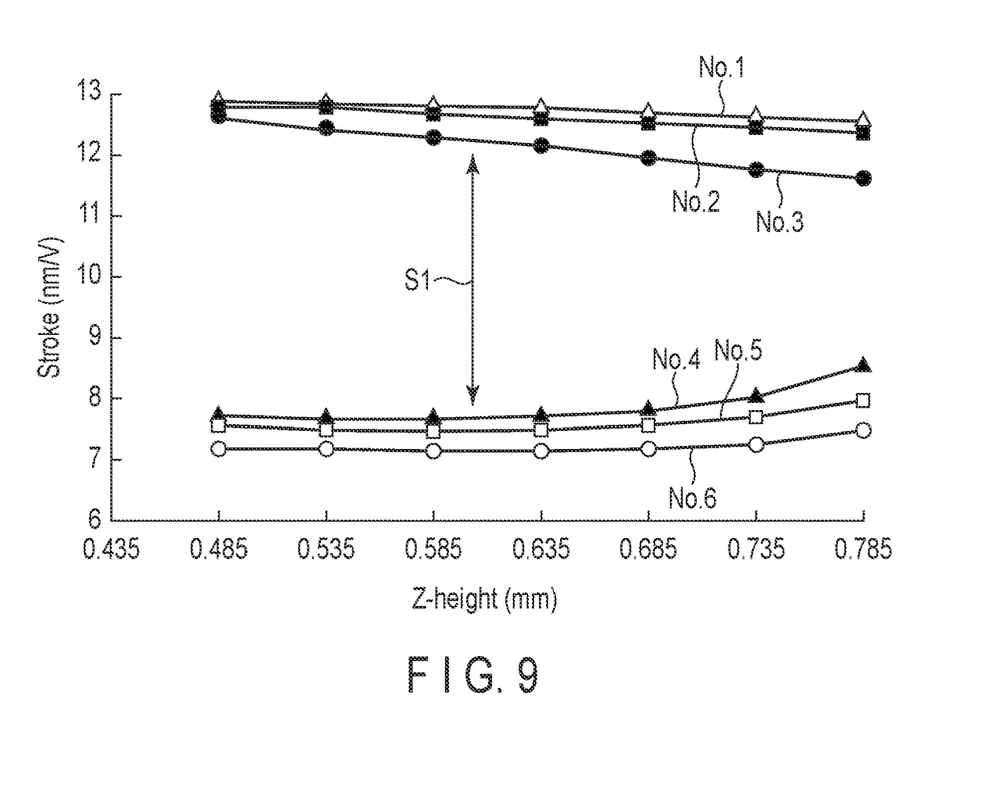
FIG. 9 is a diagram showing the relationship between Z-height and the stroke in a sway direction regarding a plurality of suspensions (No. 1 to No. 6).

FIG. 9 shows the relationship between Z-height and the stroke in a sway direction regarding six co-located actuator (CIA) types of suspensions (No. 1 to No. 6). All of these suspensions comprise the first pillow portions 70 and 71. In FIG. 9, the horizontal axis indicates Z-height. As the Z-height decreases, the deformation of the suspension (the deformation in the direction shown by arrow Z in FIG. 8) is increased. As the deformation of the suspension is increased, the reaction force of the suspension is increased.

No. 1 to No. 3 shown in the upper part of FIG. 9 show the strokes when the slider 40 is not in contact with the pillow portions 70. No. 1 to No. 3 do not have a problem as a stable large stroke is obtained. No. 4 to No. 6 shown in the lower part of FIG. 9 show the strokes when the slider 40 is in contact with the pillow portions 70. Although the strokes of No. 4 to No. 6 are small, they are stable. Thus, they do not have a problem.

However, when the slider 40 is unstably in contact with the pillow portions 70, a problem occurs. When the slider 40 and the pillow portions 70 are in an unstable contact state, an irregular stroke change occurs in range S1 (shown in FIG. 9) between the large strokes of No. 1 to No. 3 and the small stokes of No. 4 to No. 6. This change is not desirable to appropriately maintain the stroke characteristics of the co-located actuator (CLA) type of suspension 10.

To the contrary, in the suspension 10 of the present embodiment, when the slider 40 is attached to the tongue 25 by the adhesive in the manufacturing process, the slider 40 is supported on the tongue 25 by the first pillow portions 70 and 71. In addition, the slider 40 is supported on the load beam 11 by the second pillow portion 80. This structure prevents the application of the force applied from the slider 40 in a direction which deforms the first tongue portion 26. Thus, the destabilization of the contact between the slider 40 and the first pillow portions 70 is avoided.

Figure 10:
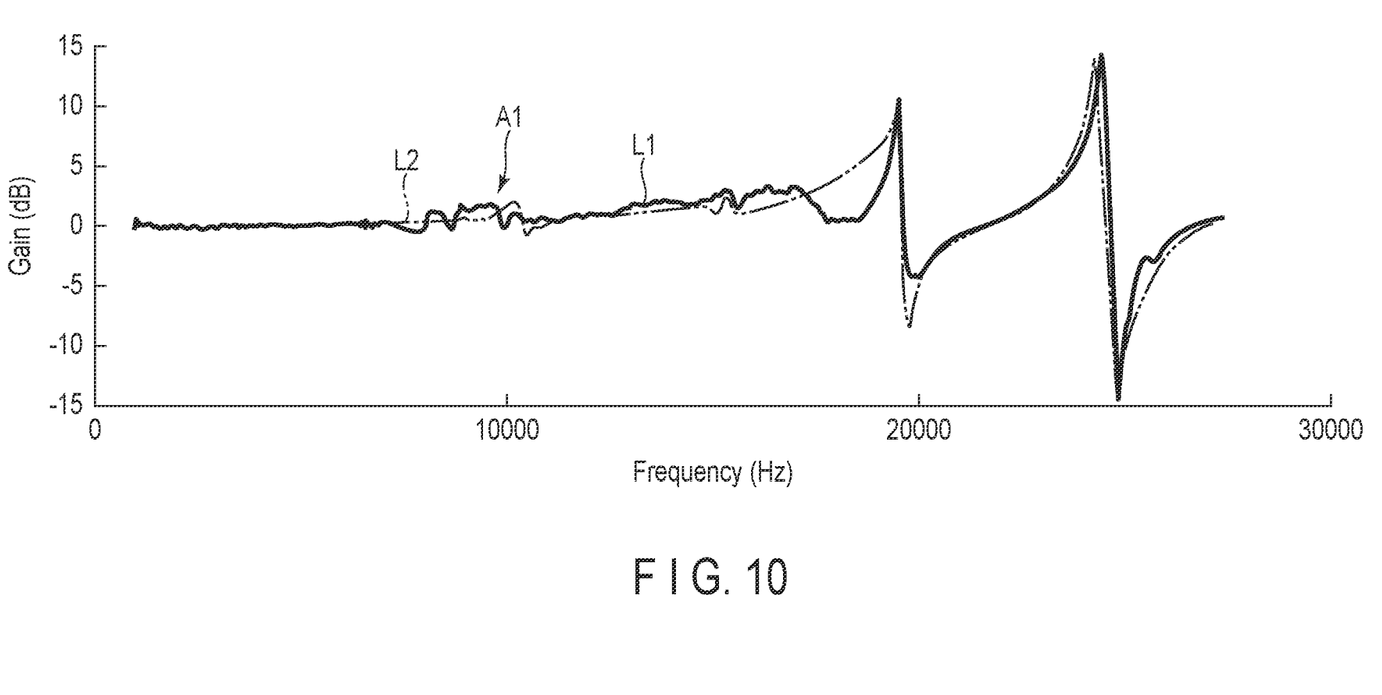
FIG. 10 is a diagram showing the oscillation mode of the suspension of the first embodiment and the oscillation mode of a conventional suspension.

FIG. 10 shows the relationship between the frequency and the gain when oscillation is applied to the suspension. In FIG. 10, the solid line L1 represents the oscillation mode of a conventional CLA type of suspension. In the conventional suspension, a noticeable fluctuation occurs in the oscillation mode near 10 kHz shown by arrow A1. In FIG. 10, the two-dot chain line L2 represents the oscillation mode of the suspension 10 of the present embodiment. In the suspension 10 of the present embodiment, unlike the conventional suspension, a fluctuation does not occur in the oscillation mode near 10 kHz. Thus, a desirable oscillation mode is obtained.

Second Embodiment

Figure 11:
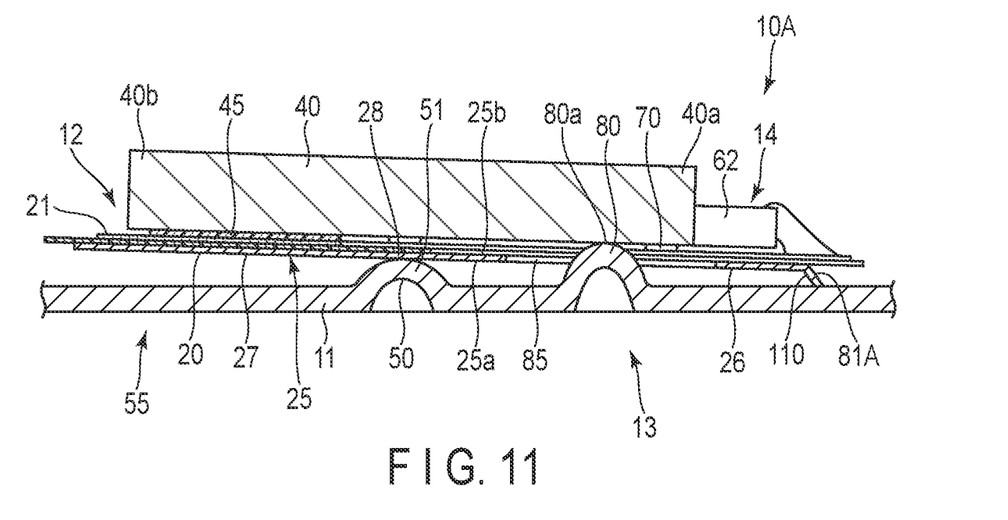
FIG. 11 is a cross-sectional view showing part of a suspension and a slider according to a second embodiment.

FIG. 11 is a cross-sectional view showing part of a suspension 10A according to a second embodiment. This suspension 10A comprises a bent part 110 in part of a tongue 25, for example, in the distal end of the tongue 25. The bent part 110 bends toward a load beam 11. The bent part 110 functions as a height controlling protrusion portion 81A. As shown in FIG. 11, when the tongue 25 is located at a first position, a second pillow portion 80 is in contact with a slider 40. In addition, the height controlling portion 81A is in contact with the load beam 11.

When the tongue 25 has moved to a second position, the second pillow portion 80 separates from the slider 40. In addition, the height controlling protrusion portion 81A separates from the load beam 11. The other structures and effects are common to the suspension 10 of the first embodiment (FIG. 1 to FIG. 10) and the suspension 10A of the second embodiment. Thus, the structural elements common to the embodiments are denoted by common reference numbers, detailed description thereof being omitted.

Third Embodiment

Figure 12:
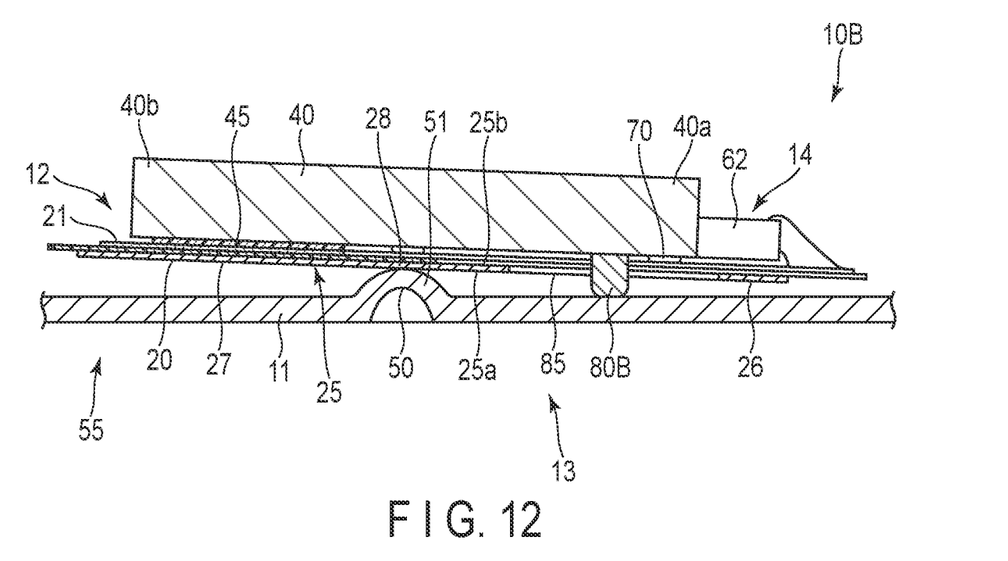
FIG. 12 is a cross-sectional view showing part of a suspension and a slider according to a third embodiment.

FIG. 12 is a cross-sectional view showing part of a suspension 10B according to a third embodiment. In this suspension 10B, a second pillow portion 80B is formed on a slider 40. As shown in FIG. 12, when a tongue 25 is located at a first position, the second pillow portion 80B is in contact with a load beam 11. When the tongue 25 has moved to a second position, the second pillow portion 80B separates from the load beam 11. The other structures and effects are common to the suspension 10 of the first embodiment (FIG. 1 to FIG. 10) and the suspension 10B of the third embodiment. Thus, the structural elements common to the embodiments are denoted by common reference numbers, detailed description thereof being omitted.

Fourth Embodiment

Figure 13:
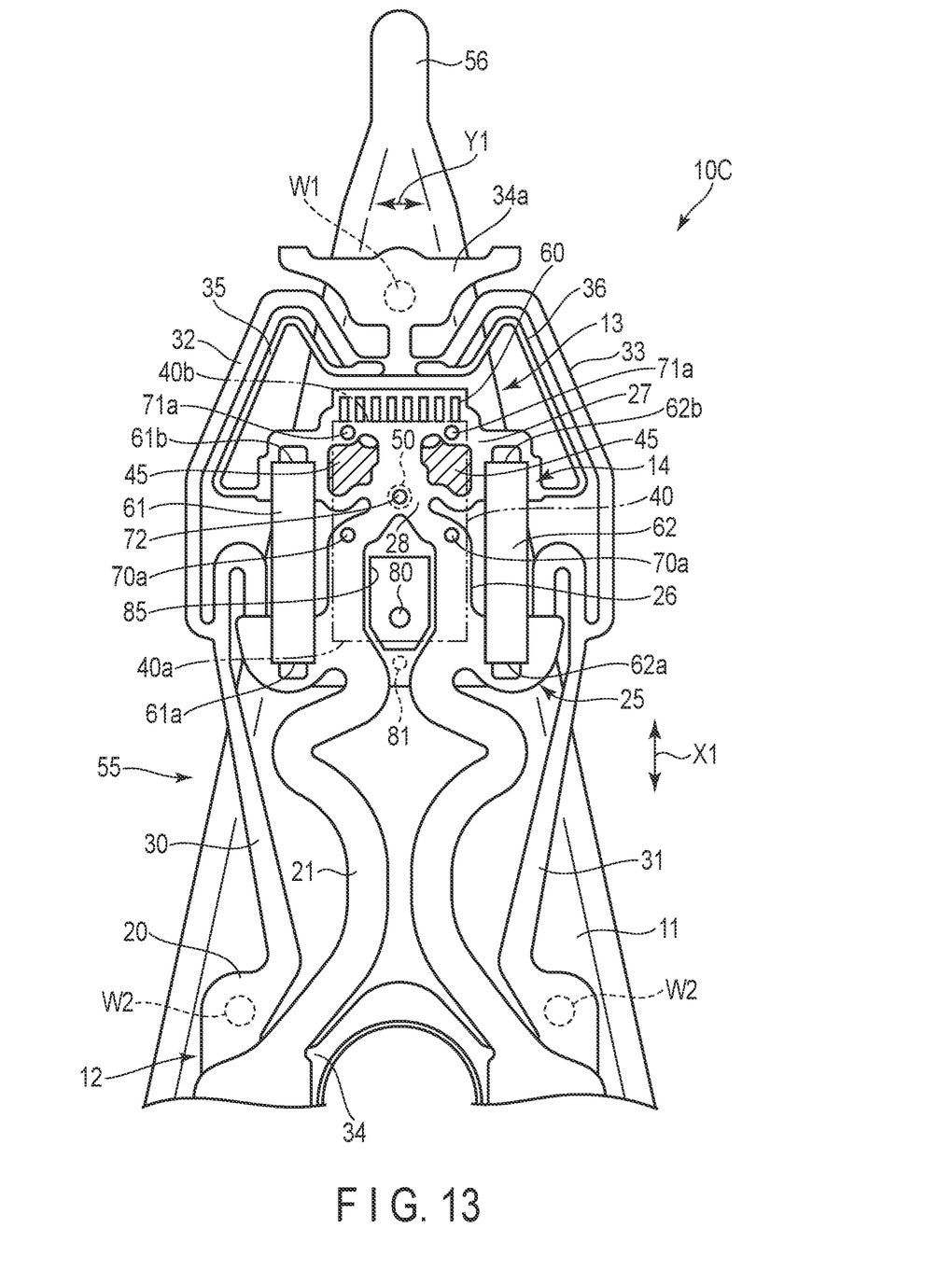
FIG. 13 is a plan view of part of a suspension according to a fourth embodiment.

FIG. 13 is a plan view showing a suspension 10C according to a fourth embodiment. This suspension 10C comprises, in a manner similar to that of the suspension 10 of the first embodiment (FIG. 1 to FIG. 10), a first tongue portion 26, a second tongue portion 27 and a hinge portion 28. The leading side portion 40a of a slider 40 is provided in the first tongue portion 26. The trailing side portion 40b of the slider 40 is provided in the second tongue portion 27.

The first pillow portions of the suspension 10C include a leading side pillow 70a, a trailing side pillow 71a and a dimple side pillow 72. The leading side pillow 70a is provided near the hinge portion 28 of the first tongue portion 26. The trailing side pillow 71a is provided on the second tongue portion 27. The dimple side pillow 72 is provided at a position corresponding to a dimple portion 50. The other structures and effects are common to the suspension 10 of the first embodiment (FIG. 1 to FIG. 10) and the suspension 10C of the fourth embodiment. Thus, the structural elements common to the embodiments are denoted by common reference numbers, detailed description thereof being omitted.

Fifth Embodiment

Figure 14:
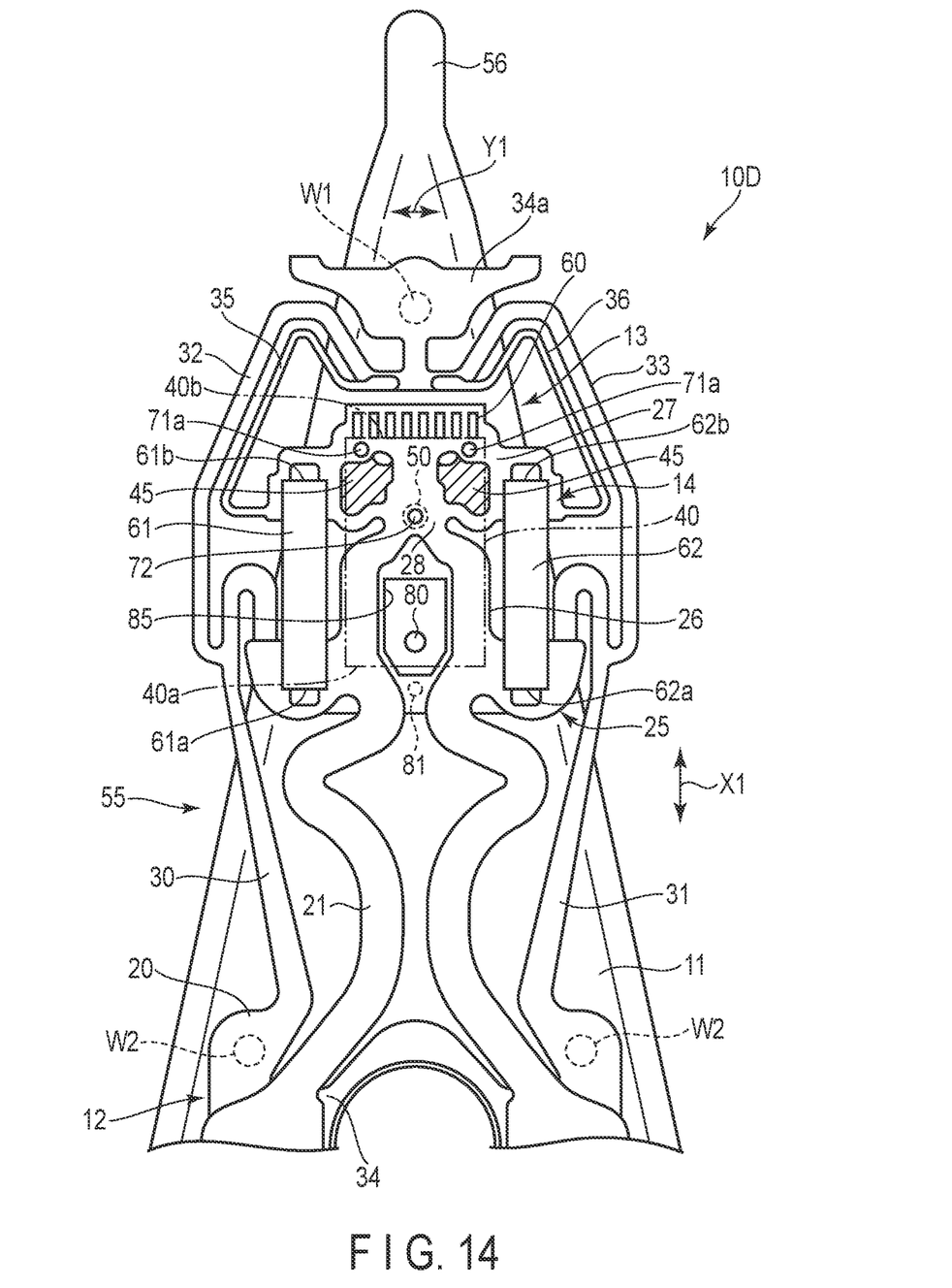
FIG. 14 is a plan view of part of a suspension according to a fifth embodiment.

FIG. 14 is a plan view showing a suspension 10D according to a fifth embodiment. In this suspension 10D, a trailing side pillow 71a as a first pillow portion is provided on a second tongue portion 27. A dimple side pillow 72 as a first pillow portion is provided at a position corresponding to a dimple portion 50. No first pillow portion is provided on a first tongue portion 26. The other structures and effects are common to the suspension 10C of the fourth embodiment (FIG. 13) and the suspension 10D of the fifth embodiment. Thus, the structural elements common to the embodiments are denoted by common reference numbers, detailed description thereof being omitted.

As a matter of course, the present invention can be implemented by modifying the structural elements constituting the suspension in various ways in terms of the specific forms such as the shapes or positions of the first pillow portions, the second pillow portion, the height controlling protrusion portion, etc. The technical idea of the present invention may be applied to a suspension other than a co-located actuator (CLA) type of suspension.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a load beam;
   a flexure provided along the load beam and comprising a tongue on which a slider is mounted; and
   a dimple portion provided between the load beam and the tongue and comprising a protrusion portion swingably supporting the tongue in a thickness direction of the tongue at least over a first position and a second position,
   wherein the tongue comprises:
   a first surface facing the load beam;
   a second surface on which the slider is mounted;
   first pillow portions supporting the slider;
   an adhesive portion fixing the slider; and
   a second pillow portion provided on the load beam, protruding toward the slider, being in contact with the slider when the tongue is located at the first position, and separating from the slider when the tongue has moved to the second position.

2. The disk drive suspension of claim 1, wherein the tongue further comprises an opening portion into which the second pillow portion is inserted.

3. The disk drive suspension of claim 1, wherein the tongue further comprises:
   a first tongue portion in which a leading side portion of the slider is movably placed;
   a second tongue portion to which a trailing side portion of the slider is fixed by the adhesive portion; and
   a hinge portion connecting the first tongue portion and the second tongue portion,
   wherein actuator elements which drive the second tongue portion in a sway direction are provided on both sides of the tongue.

4. The disk drive suspension of claim 1, wherein the load beam further comprises a height controlling protrusion portion, and a distance from the second surface to a distal end of the second pillow portion is controlled by the height controlling protrusion portion.

5. The disk drive suspension of claim 1, wherein the tongue further comprises a height controlling protrusion portion, and a distance from the second surface to a distal end of the second pillow portion is controlled by the height controlling protrusion portion.

6. The disk drive suspension of claim 5, wherein the height controlling protrusion portion further comprises a bent part formed by bending part of the tongue toward the load beam.

7. The disk drive suspension of claim 1, wherein the tongue further comprises:
- a first tongue portion in which a leading side portion of the slider is provided;
- a second tongue portion in which a trailing side portion of the slider is provided; and
- a hinge portion connecting the first tongue portion and the second tongue portion, wherein the first pillow portions include:
- a trailing side pillow provided in the second tongue portion; and
- a dimple side pillow provided at a position corresponding to the dimple portion.

8. A disk drive suspension comprising:
a load beam;
a flexure provided along the load beam and comprising a tongue on which a slider is mounted; and
a dimple portion provided between the load beam and the tongue and comprising a protrusion portion swingably supporting the tongue in a thickness direction of the tongue at least over a first position and a second position, wherein the tongue comprises:
a first surface facing the load beam;
a second surface on which the slider is mounted;
first pillow portions supporting the slider;
an adhesive portion fixing the slider; and
a second pillow portion provided on the slider, protruding from an opening portion formed in the tongue toward the load beam, being in contact with the load beam when the tongue is located at the first position and separating from the load beam when the tongue has moved to the second position.

* * * * *